(12) United States Patent
Ziaja et al.

(10) Patent No.: US 7,347,489 B2
(45) Date of Patent: Mar. 25, 2008

(54) FRONT END FOR A VEHICLE AND METHOD FOR MAKING SAME

(75) Inventors: Henry J Ziaja, Dearborn, MI (US); Ian N Dupret, Farmington Hills, MI (US); Randy Wall, Chesterfield, MI (US); Robert Cukr, Macomb, MI (US); Dennis Wilgus, Grosse Ile, MI (US); John Showalter, Northville, MI (US)

(73) Assignee: Chrysler LLC, Auburn Hills, MI (US)

( * ) Notice: Subject to any disclaimer, the term of this patent is extended or adjusted under 35 U.S.C. 154(b) by 88 days.

(21) Appl. No.: 11/225,480

(22) Filed: Sep. 13, 2005

(65) Prior Publication Data

US 2007/0057534 A1    Mar. 15, 2007

(51) Int. Cl.
*B62D 25/08* (2006.01)

(52) U.S. Cl. .......................... 296/193.03; 296/193.04; 296/193.09

(58) Field of Classification Search ........... 296/193.03, 296/193.04, 193.09, 203.02
See application file for complete search history.

(56) References Cited

U.S. PATENT DOCUMENTS

| | | | |
|---|---|---|---|
| 6,357,821 B1 * | 3/2002 | Maj et al. | 296/193.09 |
| 6,416,119 B1 | 7/2002 | Gericke et al. | |
| 6,502,653 B1 * | 1/2003 | Balzer et al. | 180/68.4 |
| 6,516,906 B2 * | 2/2003 | Sasano et al. | 180/68.4 |
| 6,540,284 B2 * | 4/2003 | Miyata | 296/203.02 |
| 6,893,081 B2 * | 5/2005 | Sasano et al. | 296/203.02 |
| 7,188,892 B2 * | 3/2007 | Tazaki et al. | 296/193.09 |

* cited by examiner

*Primary Examiner*—Dennis H. Pedder
(74) *Attorney, Agent, or Firm*—Ralph E. Smith

(57) ABSTRACT

A vehicle end portion includes a right-hand closure assembly, a left-hand closure assembly, an end module, and at least one locating component positioned to locate the end module relative the left-hand closure assembly and the right-hand closure assembly.

16 Claims, 7 Drawing Sheets

FRONT END FOR A VEHICLE AND METHOD FOR MAKING SAME

FIELD OF THE INVENTION

The present invention relates to a front end module for a motor vehicle, and more particularly to a closure assembly for use in a front end module for a motor vehicle.

BACKGROUND

When closure assemblies are used in the design of some vehicles, they are typically joined with an end module to form an end portion of the vehicle. For example, for a vehicle front end, the closure assembly includes a frame and body panels that form the front quarter panels and wheel wells of the vehicle. A front end module is provided that commonly includes front end grill, headlights and other forward components of the vehicle. Of course, both the front end module as well as the closure assemblies may include more or fewer components than those discussed above.

If the vehicle front end module is not properly aligned with the closure assemblies, difficulties may arise in the finish look of the vehicle. For example, tolerance or gap dimensions between the front end module and closure assemblies may be excessive. Additionally, the orientation of the front end module with respect to the remainder of the vehicle, including the closure assemblies, may also be incorrect.

SUMMARY

An end portion of a vehicle includes a right-hand closure assembly, a left-hand closure assembly, an end module, and at least one locating component positioned to locate the end module with the left-hand closure assembly and the right-hand closure assembly.

BRIEF DESCRIPTION OF THE DRAWINGS

The present invention will now be described, by way of example, with reference to the accompanying drawings, in which.

DETAILED DESCRIPTION

Figure 1:
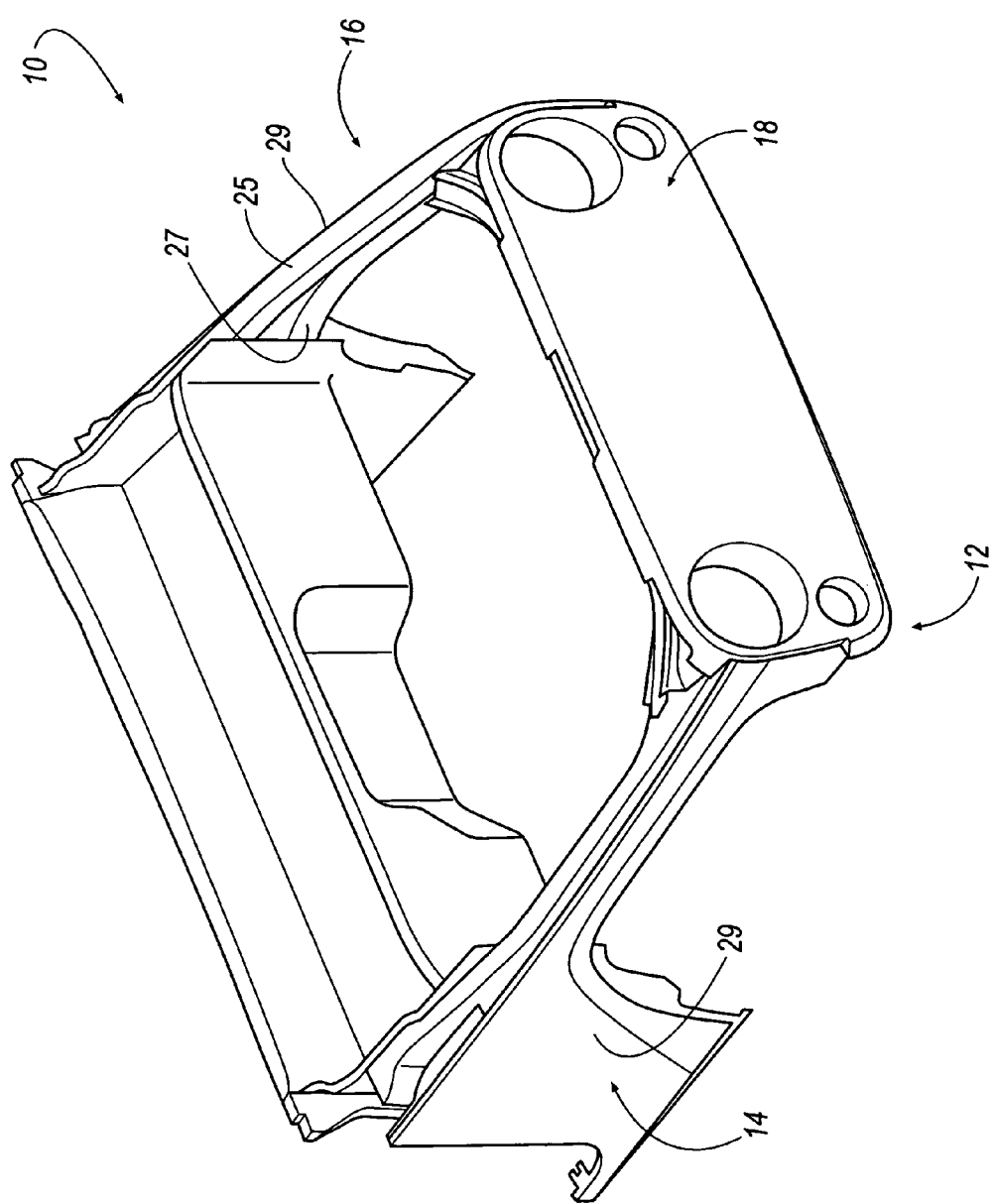
FIG. 1 is an isometric view of a front end assembly according to an embodiment of the invention.

Referring now to FIG. 1, an exemplary embodiment of the front end assembly according to the invention as shown and described. In FIG. 1, a front end 12 is shown in connection with a vehicle 10. A front end 12 generally includes a right-hand closure assembly 14, a left-hand closure assembly 16, and a front end module 18. As will be understood by one skilled in the art, in an embodiment, the right-hand closure assembly 14 and left-hand closure assembly 16 generally include a frame assembly with a body component positioned thereon. For example, as shown In FIG. 1, the left-hand closure assembly 16 generally includes a body panel 29 connected to an upper frame rail 25 and lower frame rail 27. It will be understood that, although not shown in FIG. 1, the right-hand closure assembly 14 includes the same frame and body components as discussed with respect to the left-hand closure assembly 16. One skilled in the art will readily understand that different components or configurations may be used for the right-hand closure assembly 14 or left-hand closure assembly 16.

The front end module 18, in an exemplary embodiment, generally includes components in the front end of the vehicle such as headlights, grill or other known components supported by the body panels and/or frame components.

Figure 2:
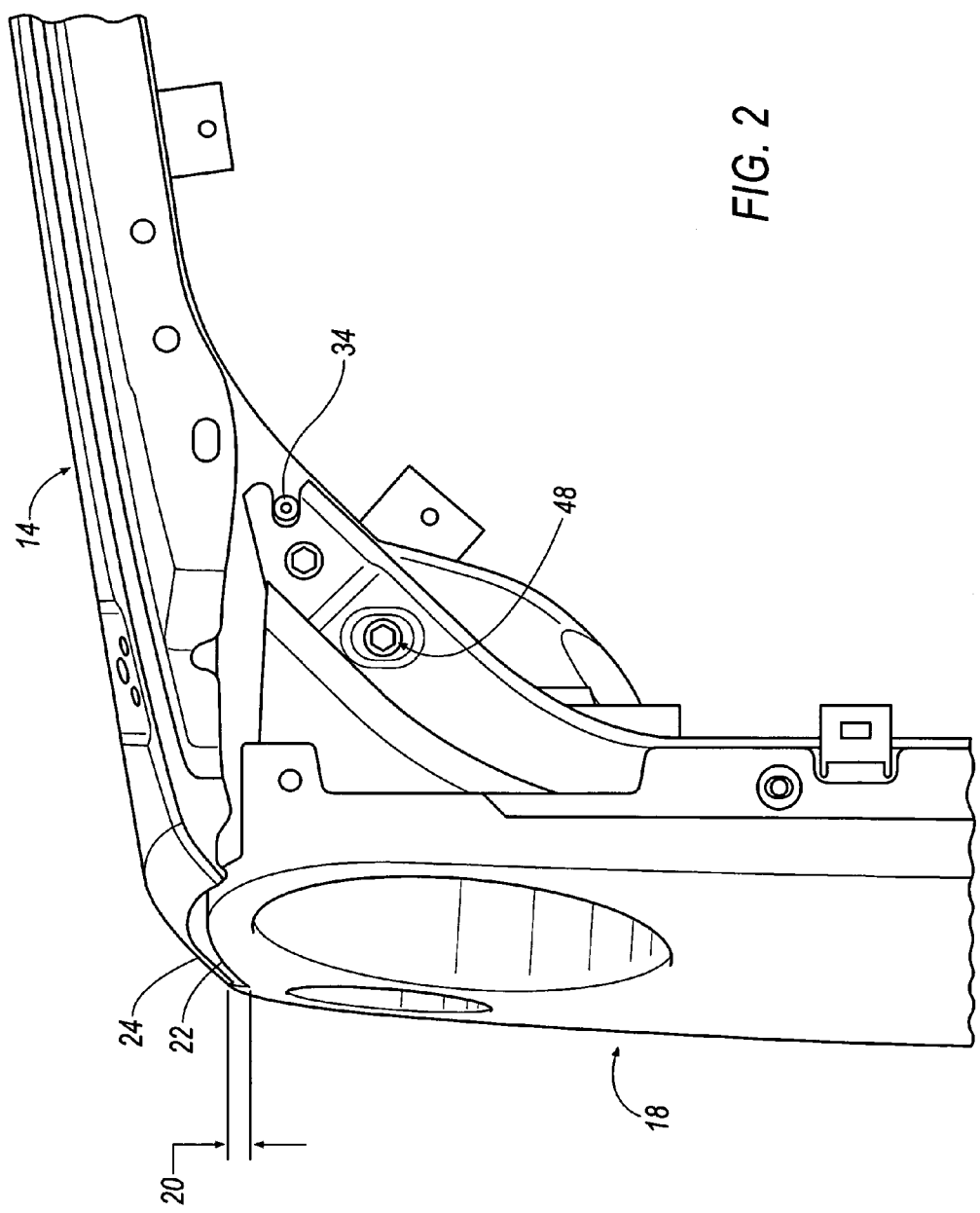
FIG. 2 is a partial top view of a front end assembly according to an embodiment of the invention.

As shown in FIG. 2, a gap 20 is formed between the front end module 18 and the right-hand closure assembly 14. More specifically, an edge 22 of the front end module 18 forms the gap 20 with the edge 24 of the right-hand closure assembly 14. In an embodiment, this gap 20 is dimensioned to meet a predetermined tolerance. In an exemplary embodiment, gap 20 is an example of one of many gaps or tolerances that are maintained between the closure assemblies 14 and 16 and the front end module 18. Accordingly, in an exemplary embodiment, the orientation of the front end module 18 with respect to the closure assemblies 14 and 16, determines the proper spacing of gap 20 or other tolerances.

Figure 3:
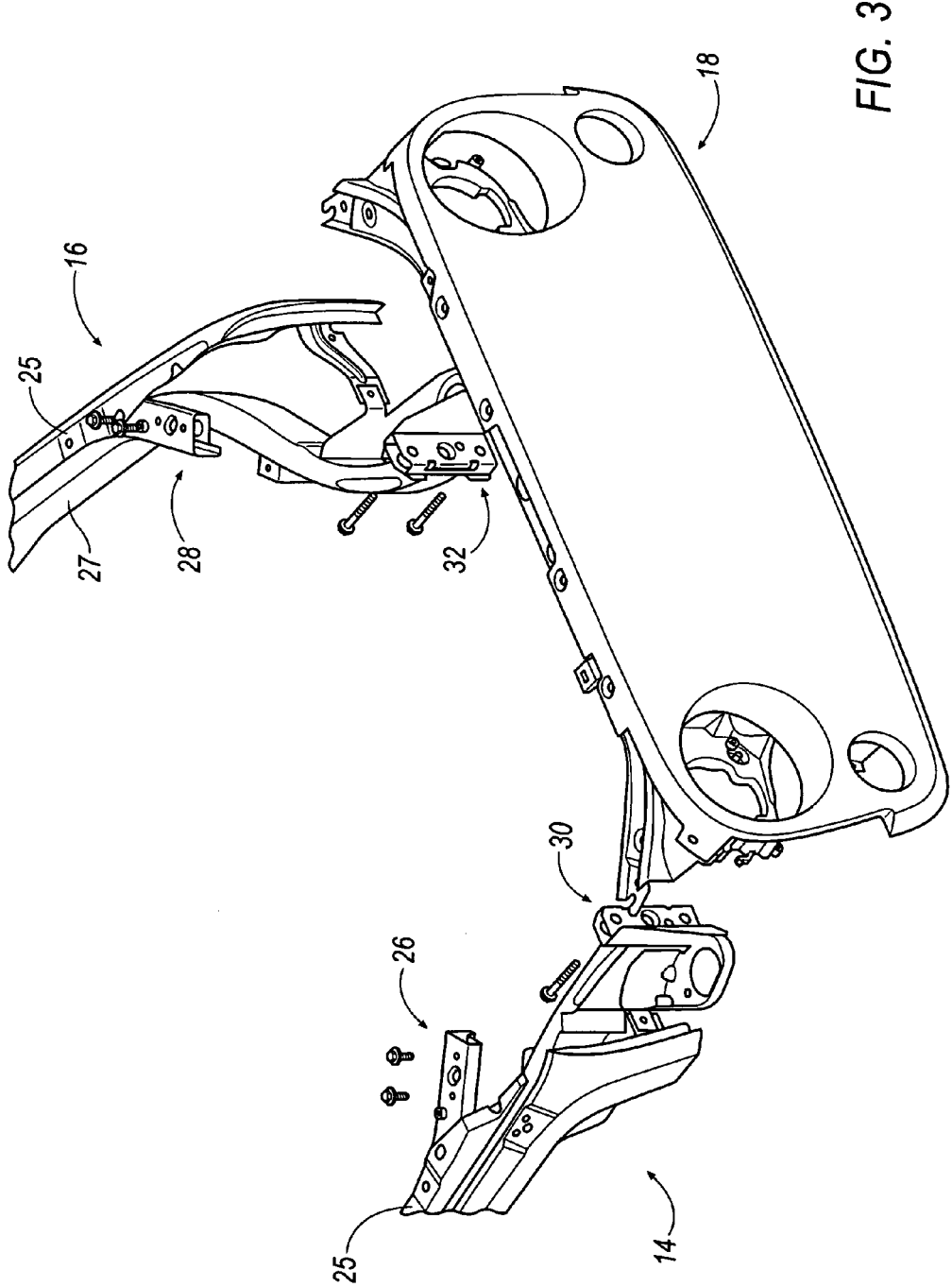
FIG. 3 is an exploded isometric view of a partial front end assembly according to an embodiment of the invention.

With respect to FIG. 3, the right-hand closure assembly 14 and left-hand closure assembly 16 each have specific locating components that are adapted to orient the front end module 18 with respect to the closure assemblies 14 and 16. More specifically, as shown in FIG. 3, the right-hand closure assembly 14 includes locating components 26 and 30 while the left-hand closure assembly 16 includes locating components 28 and 32. In an exemplary embodiment, locating in components 26, 28, 30 and 32 act to positively locate the front end module 18 with respect to the closure assemblies 14 and 16 by interacting with areas on the front end module 18 to properly orient the front end module 18 with respect to the closure assemblies 14 and 16. Such locating, in an embodiment, assists in maintaining gaps, such as gap 20 (see FIG. 1), within specified tolerances.

Figure 4:
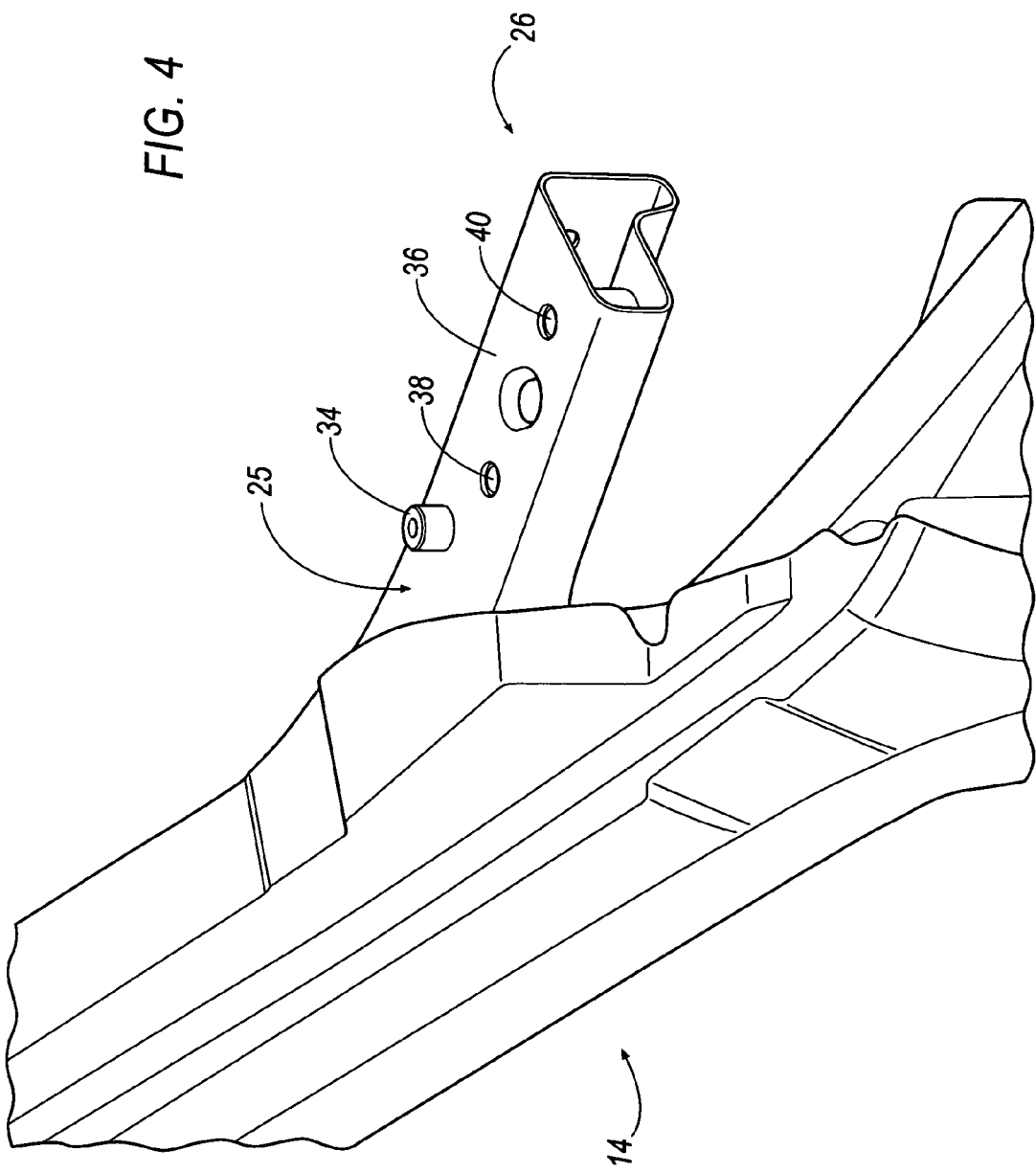
FIG. 4 is an isometric view of a component of a front end assembly according to an embodiment of the invention.

With reference to FIG. 4, an exemplary embodiment of the locating component 26 of the right-hand closure assembly 14 is shown and described in greater detail. Although the following description relates to the right-hand closure assembly, it will be understood that the left-hand closure assembly 16 includes the same or similar components. Accordingly, likewise description has been omitted.

As shown in FIG. 4, the locating component 26 generally includes a locating pin 34, surface 36, securing aperture 38 and closure assembly fore/aft aperture 40. In an embodiment, these elements are located on an upper surface (with respect to a normal orientation of the vehicle 10) of the upper frame rail 25.

Figure 5:
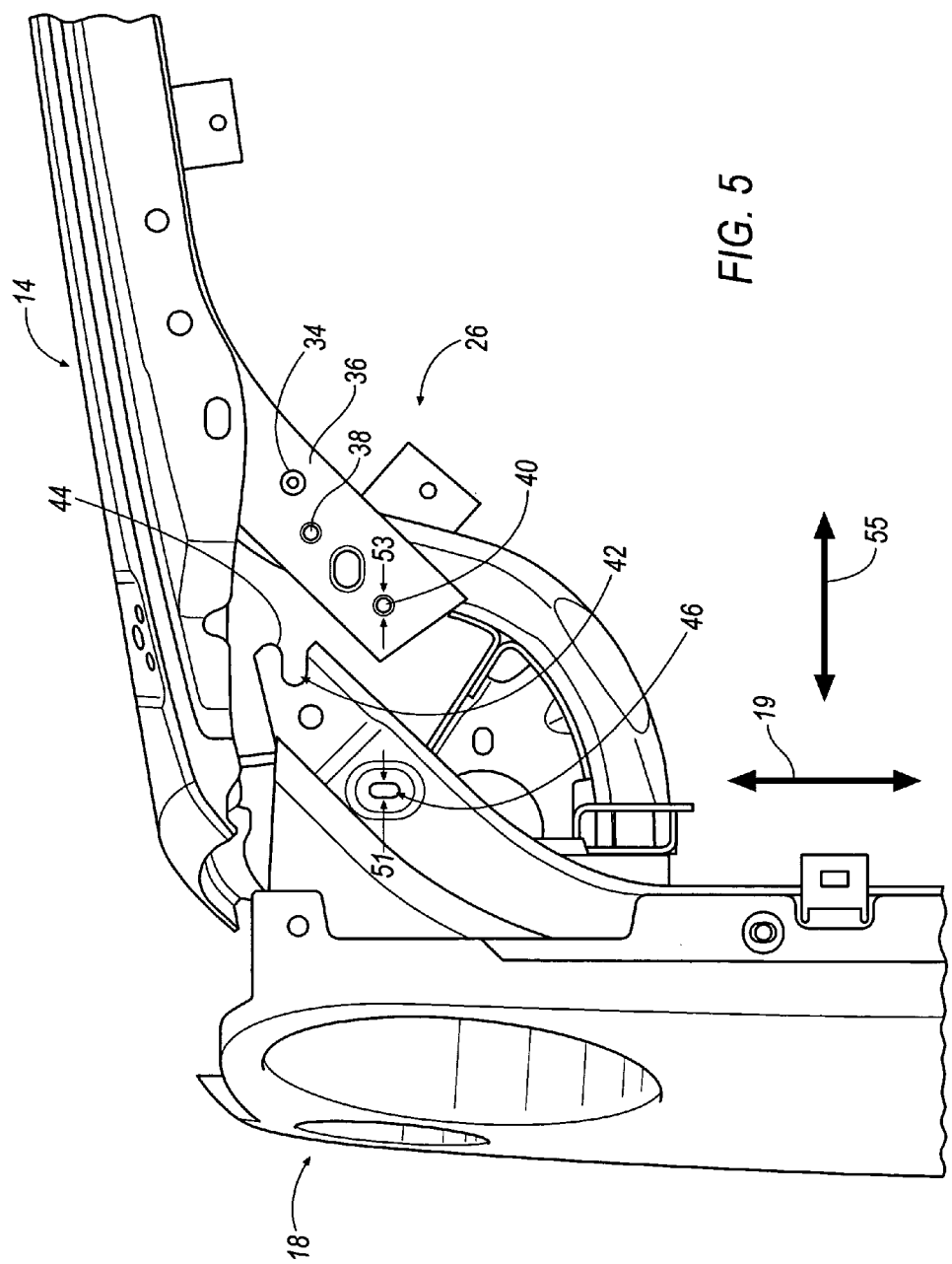
FIG. 5 is a partial top view of a front end assembly according to an embodiment of the invention.
Figure 6:
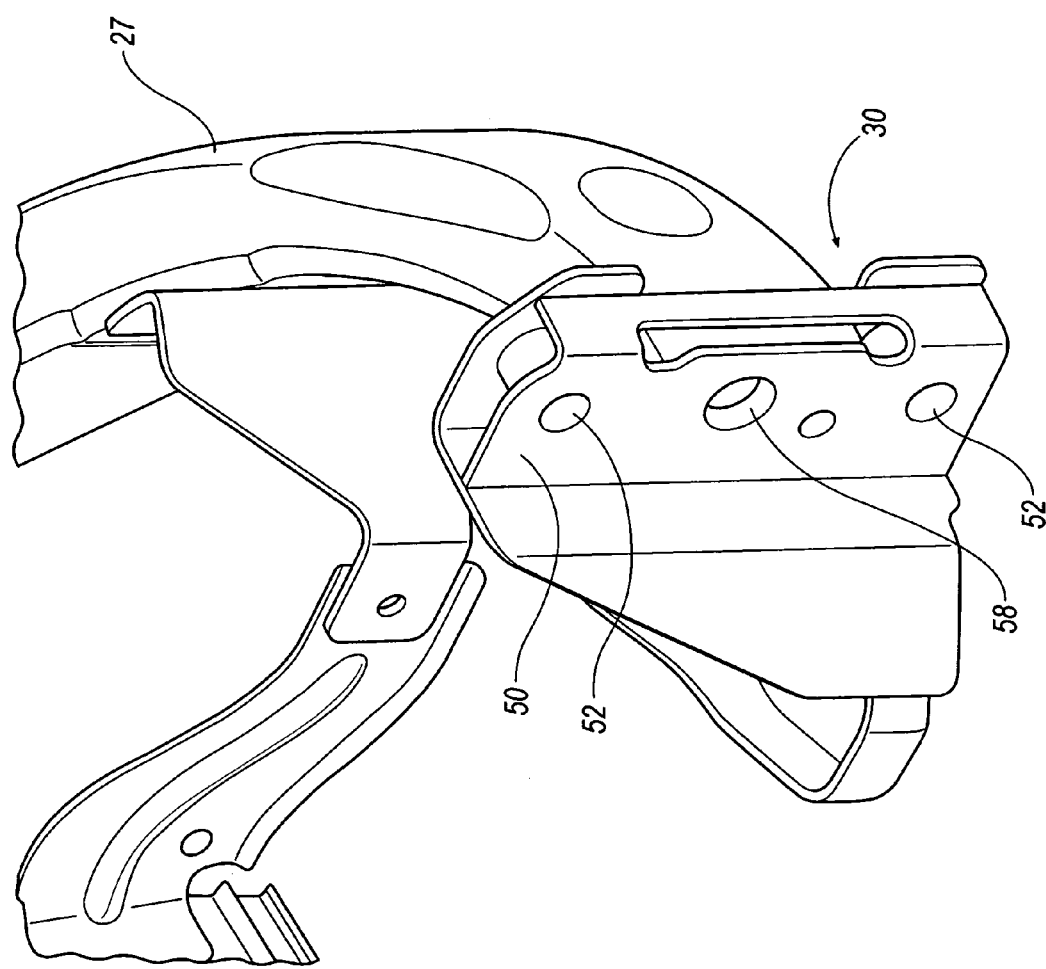
FIG. 6 is an isometric view of a component for a front end assembly according to an embodiment of the invention.

Referring now to FIGS. 5 and 6, the front end module 18 includes locating components adapted to receive the locating component 26 of the right-hand closure assembly 14. In an embodiment, the locating components of the front end module 18 generally include slot 42 and front end module fore/aft locating aperture 46. The slot 42 is sized to register with an outer surface of the locating pin 34 of the locating component 26. In an embodiment, the slot 42 is open ended (i.e., "C" shaped) and includes a guide chamfer 44 which assists in positioning the locating pin 34 into the slot 42. A tight tolerance between the slot 42 and locating pin 34, in an embodiment, assists in locating the front end module 18 at a proper cross car location with respect to the closure assemblies 14 and 16. The cross car location is defined as, in an embodiment, the locating of the front end module along the direction 19 shown in FIG. 5. Through such positioning, a gap 20 (see FIG. 2) is sized to meet tolerance requirements during assembly of the front end module 18 on the closure assemblies 14 and 16.

With continued reference to FIGS. 5 and 6, front end module fore/aft locating aperture 46 aligns with closure assembly fore/aft locating aperture 40 to adjust an fore/aft location of the front end module 18. More specifically, each one of the apertures has a diameter 51 or 53 that is larger than a diameter of a connector 48 (see FIG. 7), such as a bolt, that passes through the diameters 51,53. Because of this oversize design between connector 48 and each one of the diameters 51,53, the top of the front end module 15 (with respect to a normal orientation of the vehicle 10) may be moved fore and aft along direction 55 to adjust a location of the front end module 18 with respect to the closure assemblies 14 and 16. Once the front end module 18 is properly positioned, the connector 48 may be tightened to secure the front end module 18 Into position.

Figure 7:
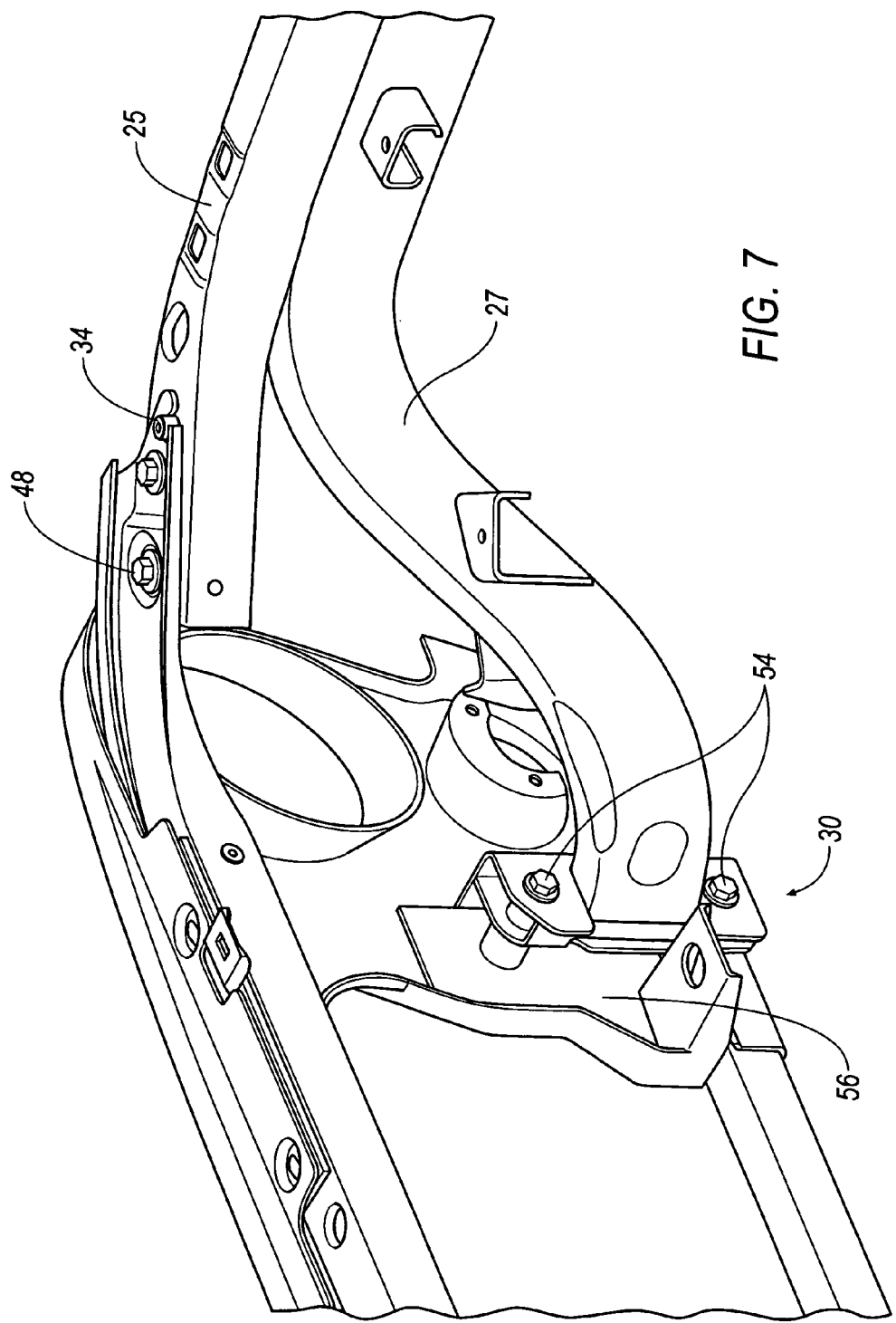
FIG. 7 is an isometric view of a front end assembly according to an embodiment of the invention.

Referring now to FIGS. 6 and 7, locating component 30 of the right-hand closure assembly 14 is described in greater detail. Although the following description relates to the right-hand closure assembly, it will be understood that the left-hand closure assembly 16 includes the same or similar components. Accordingly, likewise description has been omitted.

The locating component 30 generally includes closure assembly locating surface 50, securing aperture 52, and guide aperture 58. As shown in FIG. 7, the closure assembly locating surface 50, when assembled to the front end module 18, abuts the front end module locating surface 56. The contact between these surfaces positions a lower portion (vertical with respect to a normal orientation of the vehicle 10) of the front end module 18 to a desired orientation with respect to the fore and aft direction 55 (see FIG. 5). A guide aperture 58 provides a guide for a stub (not shown) on the front end module locating surface 56 to allow the front end module locating surface 56 to be guided into proper engagement with the locating component 30. Once the guide aperture and stud are engaged together, connectors 54, such as bolts, are positioned through the securing aperture 52 on the locating component 30 and corresponding apertures in the front end module locating surface 56 to secure the locating component 30 to front end module locating surface 56.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A vehicle end portion, comprising:
   a right-hand closure assembly;
   a left-hand closure assembly;
   an end module; and
   at least one locating component positioned to locate the end module with the left-hand closure assembly and the right-hand closure assembly the locating component further including:
   a right-hand pin formed on and extending from the right-hand closure assembly;
   a left-hand pin formed on and extending from the left-hand closure assembly;
   a right-hand slot positioned on the end module that receives the right-hand pin and is sized to enable the right-hand closure assembly to move relative to the end module; and
   a left-hand slot positioned on the end module that receives the left-hand pin and is sized to enable the left-hand closure assembly to move relative to the end module.

2. The vehicle end portion according to claim 1, wherein:
   the right-hand slot contains a right-hand entrance chamfer adapted to guide the right-hand pin into the right-hand slot; and wherein
   the left-hand slot contains a left-hand entrance chamfer adapted to guide the left-hand pin into the left-hand slot.

3. The vehicle end portion according to claim 1, wherein:
   the right-hand pin and the left-hand pin extend substantially vertically with respect to a normal orientation of the vehicle; and wherein
   the locating component locates a cross car alignment of the end module with respect to the left-hand closure assembly and the right-hand closure assembly.

4. The vehicle end portion according to claim 1, wherein the locating component further includes a fore/aft locating component and an upper fore/aft locating component each adapted to locate a fore/aft orientation of the end module with the left-hand closure assembly and the right-hand closure assembly.

5. The vehicle end portion according to claim 4, wherein the fore/aft locating component further includes:
   a right-hand locating surface positioned on the right-hand closure assembly;
   a left-hand locating surface positioned on the left-hand closure assembly;
   a right-hand front end module locating surface located on the end module that abuts the right-hand locating surface; and
   a left-hand front end module locating surface located on the end module that abuts the left-hand locating surface.

6. The vehicle end portion according to claim 5, wherein:
   the right-hand locating surface, left-hand locating surface, right-hand front end module locating surface, and left-hand front end module locating surface are positioned substantially vertical with respect to a normal orientation of the vehicle; and wherein
   the right-hand locating surface, left-hand locating surface, right-hand front end module locating surface, and left-hand front end module locating surface cooperate to locate a fore/aft orientation of the end module.

7. The vehicle end portion according to claim 5,
   wherein the upper fore/aft locating component is positioned at a location on the vehicle that is higher than the fore/aft locating component with respect to a normal orientation of the vehicle; and
   wherein the upper fore/aft locating component locates an upper fore/aft orientation of the end module with respect to the orientation of the end module located by the fore/aft locating component.

8. The vehicle end portion according to claim 7, wherein the upper fore/aft locating component further includes:
   a right-hand fore/aft locating pin on the right-band closure assembly;
   a right-hand fore/aft aperture on the end module that interacts with the right-hand fore/aft locating pin to locate a tore/aft orientation of the end module;
   a left-hand fore/aft locating pin on the left-hand closure assembly; and
   a left-hand aperture on the end module that interacts with the left-hand fore/aft locating pin to locate a fore/aft orientation of the end module.

9. The vehicle end portion according to claim 1, wherein said left hand slot and said right-hand slot are "C" shaped.

10. A method for locating an end module on a right-hand closure assembly and a left-hand closure assembly for a vehicle, comprising the steps of:
   providing a right-hand closure assembly;
   providing a left-hand closure assembly;
   locating the end module relative to the right-hand closure assembly and the left-hand closure assembly using at least one locating component;
   positioning a right-hand pin formed on the right-hand closure assembly within a right-hand slot defined in the end module; and
   moving the right-hand closure assembly such that the right-hand pin moves within the right-hand slot prior to securing the right-hand closure assembly to the end module.

11. The method according to claim 10, further including:
   positioning a left-hand pin formed on the left-hand closure assembly within a left-hand slot defined in the end module; and
   moving the left-hand closure assembly such that the left-hand pin moves within the left-hand slot prior to securing the left-hand closure assembly to the end module.

12. The method according to claim 11, wherein:
   the right-hand pin and the left-hand pin extend substantially vertically with respect to a normal orientation of the vehicle; and wherein
   the locating component locates a cross car alignment of the end module with the left-hand closure assembly and the right-hand closure assembly.

13. The method according to claim 11, wherein the locating step further comprises locating a fore/aft orientation of the end module with relative to a fore/aft locating component.

14. The method according to claim 13, wherein the step of locating the fore/aft orientation of the end module, further includes:
   providing a right-hand locating surface on the right-hand closure assembly;
   providing a left-hand locating surface on the left-hand closure assembly:
   providing a right-hand front end module surface on the end module;
   providing a left-hand front end module surface on the end module;
   positioning the right-hand locating surface against the right-hand front end module surface; and
   positioning the left-hand locating surface against the left-hand front end module surface.

15. The method according to claim 14, further including locating an upper fore/aft orientation of the end module proximate an upper end of the end module with respect to a normal orientation of the vehicle.

16. A method according to claim 15, wherein the step of locating an upper fore/aft orientation further includes:
   providing a right-hand fore/aft aperture in a portion of the right-hand closure assembly;
   providing a left-hand fore/aft aperture in a portion of the left-hand closure assembly;
   providing a right-hand end module aperture in the end module;
   providing a left-hand end module aperture in the end module;
   positioning a right-hand connector through the right-hand fore/aft aperture and the right-hand end module aperture; and
   positioning a left-hand connector through the left-hand fore/aft aperture and the left-hand end module aperture.

* * * * *